US008052911B2

(12) United States Patent
Ichikawa

(10) Patent No.: US 8,052,911 B2
(45) Date of Patent: Nov. 8, 2011

(54) METHOD FOR MANUFACTURING PLUGGED HONEYCOMB STRUCTURE

(75) Inventor: Yukihito Ichikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1173 days.

(21) Appl. No.: 11/657,040

(22) Filed: Jan. 24, 2007

(65) Prior Publication Data
US 2007/0184241 A1 Aug. 9, 2007

(30) Foreign Application Priority Data

Feb. 2, 2006 (JP) ................. 2006-025998

(51) Int. Cl.
*B29C 45/02* (2006.01)
*B29C 45/14* (2006.01)

(52) U.S. Cl. ............... 264/267; 264/271.1; 264/275; 264/DIG. 48

(58) Field of Classification Search .............. None
See application file for complete search history.

(56) References Cited

U.S. PATENT DOCUMENTS

| 4,519,820 | A  | * | 5/1985  | Oyobe et al. ............. 55/284 |
| 4,557,962 | A  | * | 12/1985 | Belmonte et al. ......... 428/117 |
| 5,021,204 | A  | * | 6/1991  | Frost et al. .............. 264/630 |
| 5,433,904 | A  | * | 7/1995  | Noky .................. 264/40.1 |
| 7,687,008 | B2 | * | 3/2010  | Okazaki et al. ........... 264/442 |
| 7,922,951 | B2 | * | 4/2011  | Mudd et al. ............. 264/259 |
| 2002/0189217 | A1 | * | 12/2002 | Ishihara et al. ........... 55/523 |
| 2004/0065068 | A1 | * | 4/2004  | Otsubo et al. ............ 55/523 |
| 2005/0042419 | A1 |   | 2/2005  | Kato |
| 2006/0150598 | A1 |   | 7/2006  | Ichikawa et al. |
| 2006/0168927 | A1 |   | 8/2006  | Watanable et al. |
| 2008/0155952 | A1 | * | 7/2008  | Okazaki et al. ........... 55/523 |
| 2008/0197534 | A1 | * | 8/2008  | Ichikawa ............... 264/267 |
| 2009/0008830 | A1 | * | 1/2009  | Okazaki et al. ........... 264/442 |

FOREIGN PATENT DOCUMENTS

| JP | A-6-190218    |   | 7/1994  |
| JP | A-6-190224    |   | 7/1994  |
| JP | A 2001-300922 |   | 10/2001 |
| JP | A 2002-159811 |   | 6/2002  |
| JP | A-2003-185031 |   | 7/2003  |
| JP | 2004255623    | * | 9/2004  |
| JP | A-2005-59512  |   | 3/2005  |
| JP | 200634459     | * | 12/2006 |
| WO | WO 2004/085029 A1 | | 10/2004 |
| WO | WO 2005/005017 A1 | | 1/2005  |

* cited by examiner

*Primary Examiner* — Edmund H. Lee
(74) *Attorney, Agent, or Firm* — Oliff & Berridge, PLC

(57) ABSTRACT

Using a slurry filler having a container having an opening top and storing plugging slurry and a cover attached to the opening top of the container and having a flat upper face and through-holes communicating the inside and the outside of the container and being disposed to correspond to cells to be plugged on an end face of the honeycomb structure, the honeycomb structure is set on the cover by positioning so that opening ends of cells to be plugged of the honeycomb structure match positions of through-holes of the cover, and the plugging slurry stored in the container is filled inside opening ends of cells to be plugged through the through-holes to form the plugged portions. According to this manufacturing method, a plugged honeycomb structure having no defects can be manufactured at low costs for a short time without restriction on operation circumstances with less industrial waste.

5 Claims, 6 Drawing Sheets

METHOD FOR MANUFACTURING PLUGGED HONEYCOMB STRUCTURE

BACKGROUND OF THE INVENTION AND RELATED ART STATEMENT

The present invention relates to a plugged honeycomb structure used as a filter for filtrating particulate matter, such as a diesel particulate filter, or as a catalyst carrier for purifying harmful components such as HC, $NO_x$, and CO in exhaust gas by carrying a catalyst component on a surface of pores of porous partition walls defining cells and passing exhaust gas through the pores of the partition walls.

Since, in the exhaust gas exhausted from an internal combustion engine of a diesel engine or the like, a large amount of particulate matter having carbon which causes environmental pollution as the main component is contained, it is general that a filter for trapping (filtrating) particulate matter is mounted in an exhaust gas system thereof.

In a filter used for such a purpose, as shown in FIGS. 12(a) and 12(b), there is generally used a plugged honeycomb structure 1 having a honeycomb structure 2 where a plurality of cells 9 extending between two end faces are defined by porous partition walls 7 and plugged portions 11 disposed so as to plug one of the two opening ends of each of the cells 9 and to form a checkerwise pattern on each of the end faces complementarily between one end face and the other end face of the honeycomb structure 2.

Exhaust gas flows into the inside from one end face 3 of a filter constituted by such a plugged honeycomb structure 1, and after particulate matter and the like contained in the gas are removed, the gas flows out from the other end face 5. Specifically, exhaust gas flows into the cells 9b whose end portions are not plugged on one end face 3 and are plugged on the other end face 5 in the first place, passes through the porous partition walls 7, moves into the cells 9a whose end portions are plugged on the end face 3 and are not plugged on the other end face 5, and is discharged from the cells 9a. At this time, the partition walls 7 function as a filtration layer, and particulate matter in the gas is trapped by the partition walls 7 and accumulates on the partition walls 7.

As a method for manufacturing a plugged honeycomb structure as described above, there is known a method where an adhesive sheet or the like is bonded on one end face of a formed honeycomb body, holes are made in portions corresponding to cells to be plugged (plugged cells) of the adhesive sheet or the like by laser processing using image processing to prepare a mask, the end face having the mask bonded thereon of the formed honeycomb body is immersed in slurry for plugging to fill the slurry into the cells to be plugged of the formed honeycomb body to form plugged portions, the same process is performed with respect to the other end face of the formed honeycomb body, followed by drying and firing to obtain a plugged honeycomb structure (see, e.g., Patent Document 1).

As another manufacturing method, there has been proposed a method where through-holes are formed in an undried formed sheet-shaped green body of a ceramic material in a checkerwise pattern, and the formed sheet-shaped green body is attached to an end face of a honeycomb-shaped dried body under pressure, followed by integrally firing to obtain a plugged honeycomb structure (see, e.g., Patent Document 2).

By the way, recently, an attempt has been made to utilize such a plugged honeycomb structure as a catalyst for purifying harmful components such as HC, $NO_x$, and CO in exhaust gas by carrying a catalyst component on a surface of pores in the porous partition walls defining the cells and passing exhaust gas flowing into the honeycomb structure through the pores of the partition walls (such a catalyst is hereinbelow referred to as a "wall-flow type catalyst") other than a filter for trapping particulate matter as described above.

According to expansion of usage of such a plugged honeycomb structure, it is expected that a demand for a plugged honeycomb structure will increase much more in the future. In the case of trying to mass-produce plugged honeycomb structures by employing the manufacturing method. described in the Patent Document 1, it is required to solve the problems of (i) requiring steps of bonding an adhesive sheet, image processing, making holes, and peeling the adhesive sheet with respect to each of both the end faces of each honeycomb structure, which generates a large amount of industrial waste of peeled adhesive sheets after being used, in addition to requirement of much time to be spent on production of a mask, etc., and (ii) causing rise in production cost because an adhesive sheet is relatively expensive and requiring to perform bonding operation in clean circumstances since the sheet hates dirt and dust, which restricts operation circumstances. That is, though the above-mentioned conventional manufacturing method is effective in manufacturing a relatively small number of plugged honeycomb structures, a sufficient satisfaction cannot be derived from the conventional manufacturing method from the viewpoint of mass-production adaptability.

In addition, the manufacturing method described in Patent Document 2 has problems of easily having a crack in the sheet or peeling of the sheet due to a difference in drying shrinkage between a honeycomb-shaped dried body and an undried formed sheet-shaped green body and hard plugging of the cells to be plugged among the cells located in the outermost periphery of the honeycomb structure.

[Patent Document 1] JP-A-2001-300922
[Patent Document 2] JP-A-2002-159811

SUMMARY OF THE INVENTION

The present invention has been made in view of the problems of prior art as described above, and the aim of the present invention is to provide a method for manufacturing a plugged honeycomb structure, the method being suitable for mass-production, more particularly, without restriction on operation circumstances, capable of manufacturing a plugged honeycomb structure without any defect at low costs and also in a short time and capable of reducing an amount of industrial waste.

In order to achieve the above objective, according to the present invention, there are provided the following methods for manufacturing plugged honeycomb structures and the following plugged honeycomb structures.

[1] A method for manufacturing a plugged honeycomb structure having a honeycomb structure where a plurality of cells extending between two opening ends are defined by porous partition walls and plugged portions disposed so as to plug one of the two opening ends of each of the cells, wherein, using a slurry filler having a container having an opening top and storing plugging slurry prepared by slurring a material for the plugged portions and a cover attached to the opening top of the container and having a flat upper face and a plurality of through-holes communicating the inside and the outside of the container and disposed so as to correspond to the positions of cells to be plugged on an end face of the honeycomb structure, the honeycomb structure is set on the cover by positioning so that opening ends of cells to be plugged of the honeycomb structure match positions of the through-holes of the cover, and the plugging slurry stored in the container is filled into the inside of the opening ends of the cells to be plugged through the through-holes to form the plugged portions.

[2] A method for manufacturing a plugged honeycomb structure according to the above [1], wherein a pipe having outer dimensions smaller than the size of the opening portion of the cell is attached to each of the through-holes.

[3] A method for manufacturing a plugged honeycomb structure according to the above [2], wherein an opening end on the container outer side of the pipe is protruded upward from an upper surface of the cover.

[4] A method for manufacturing a plugged honeycomb structure according to the above [3], wherein a sealing material having a hollow ring-shape and expandable by supplying air therein is attached to an outer peripheral portion near the opening end on the container outer side of the pipe to clog a gap between the pipe inserted in the inside of each of the cells and the cell by expanding the sealing material when the plugging slurry is filled into the inside of the opening ends of the cells to be plugged.

[5] A method for manufacturing a plugged honeycomb structure according to the above [1] or [2], wherein a concave depression having dimensions smaller than the size of the opening portion of each of the cells is formed in the periphery of the opening end on the container outer side of each of the through-holes.

[6] A method for manufacturing a plugged honeycomb structure according to any one of the above [2] to [4], wherein the pipe attached to each of the through-holes is movable on the cover, a photograph of an end face of the honeycomb structure is taken in advance and subjected to image processing to recognize positional coordinates of the cells to be plugged, the pipe is moved based on data of the positional coordinates so that a position of the pipe matches a position of the cell to be plugged, and then the honeycomb structure is set on the cover.

[7] A method for manufacturing a plugged honeycomb structure according to the above [5], wherein the concave depression is movable on the cover, a photograph of an end face of the honeycomb structure is taken in advance and subjected to image processing to recognize positional coordinates of the cells to be plugged, the concave depression is moved based on data of the positional coordinates so that a position of the concave depression matches a position of the cell to be plugged, and then the honeycomb structure is set on the cover.

[8] A plugged honeycomb structure manufactured by a method according to any one of the above [1] to [7].

[9] A plugged honeycomb structure according to the above [8], wherein a protrusion or a groove functioning as a standard for positioning upon setting the honeycomb structure on the cover is formed in an outer periphery thereof.

[10] A plugged honeycomb structure having a honeycomb structure where a plurality of cells extending between two opening ends are defined by porous partition walls and plugged portions disposed so as to plug one of the two opening ends of each of the cells, wherein cells to be plugged among the cells locating in the outermost periphery of the honeycomb structure are entirely plugged with the plugged portions.

[11] A plugged honeycomb structure according to any one of the above [8] to [10], wherein the cells are plugged with the plugged portions on only one end face of the honeycomb structure.

[12] A plugged honeycomb structure according to any one of the above [9] to [11], wherein the plugged honeycomb structure is manufactured by a method according to any one of the above [2] to [4] and [6] with each of the plugged portions having a concave portion corresponding to a shape of the pipe.

[13] A plugged honeycomb structure according to any one of the above [9] to [11], wherein the plugged honeycomb structure is manufactured by a method according to the above [5] or [7] with each of the plugged portions having a convex portion corresponding to a shape of the concave depression.

A method for manufacturing a plugged honeycomb structure of the present invention is a method suitable for mass-production, where, without restriction on operation circumstances, a plugged honeycomb structure without any defect can be manufactured at low costs for a short time with reducing the amount of industrial waste. In addition, a plugged honeycomb structure of the present invention can be manufactured at low costs for a short time without restriction on operation circumstances by the above manufacturing method of the present invention and is suitable for mass-production with reducing the amount of industrial waste. In addition, even the cells to be plugged locating in the outermost periphery, where plugging is difficult, in a plugged honeycomb structure manufactured in a conventional manufacturing method where an undried formed sheet-shaped green body having through-holes in a checkerwise pattern is attached to an end face of a honeycomb-shaped dried body under pressure, followed by integrally firing, are entirely plugged with plugged portions. Therefore, in the case that the honeycomb structure is used as a filter or a carrier for a wall-flow type catalyst, it exhibits high performance.

BRIEF DESCRIPTION OF THE DRAWINGS

FIG. 12(a) is a plane view from an end face side, and FIG. 12(b) is a cross-sectional view.

DESCRIPTION OF REFERENCE NUMERALS

1: plugged honeycomb structure, 2: honeycomb structure, 3: end face, 5: end face, 7: partition wall, 9: cell, 11: plugged portion, 19: cell to be plugged, 20: slurry filler, 21: container, 23: cover, 25: through-hole, 27: pipe, 29: sealing material, 40: pressing means, 50: plugging slurry, 60: protrusion

DETAILED DESCRIPTION OF THE INVENTION

As described above, a method for manufacturing a plugged honeycomb structure of the present invention is a method for manufacturing a plugged honeycomb structure having a honeycomb structure where a plurality of cells extending between two opening ends are defined by porous partition walls and plugged portions disposed so as to plug one of the two opening ends of each of the cells, the method being mainly characterized in that, using a slurry filler having a container having an opening top and storing plugging slurry prepared by slurring a material for the plugged portions and a cover attached to the opening top of the container and having a flat upper face and a plurality of through-holes communicating the inside and the outside of the container and disposed so as to correspond to the positions of cells to be plugged on an end face of the honeycomb structure, the honeycomb structure is set on the cover by positioning so that opening ends of cells to be plugged of the honeycomb structure match positions of the through-holes of the cover, and the plugging slurry stored in the container is filled into the inside of the opening ends of the cells to be plugged through the through-holes to form the plugged portions.

Typical embodiments of the present invention will hereinbelow be described concretely with referring to drawings. However, the present invention is by no means limited to the following embodiments, and it should be understood that changes, improvements, or the like, of a design may suitably be added in a range of not deviating from the gist of the present invention on the basis of general knowledge of those skilled in the art. Incidentally, in the present specification, when a "honeycomb structure" is simply referred to, it means a honeycomb structure having no plugged portions.

Figure 1:
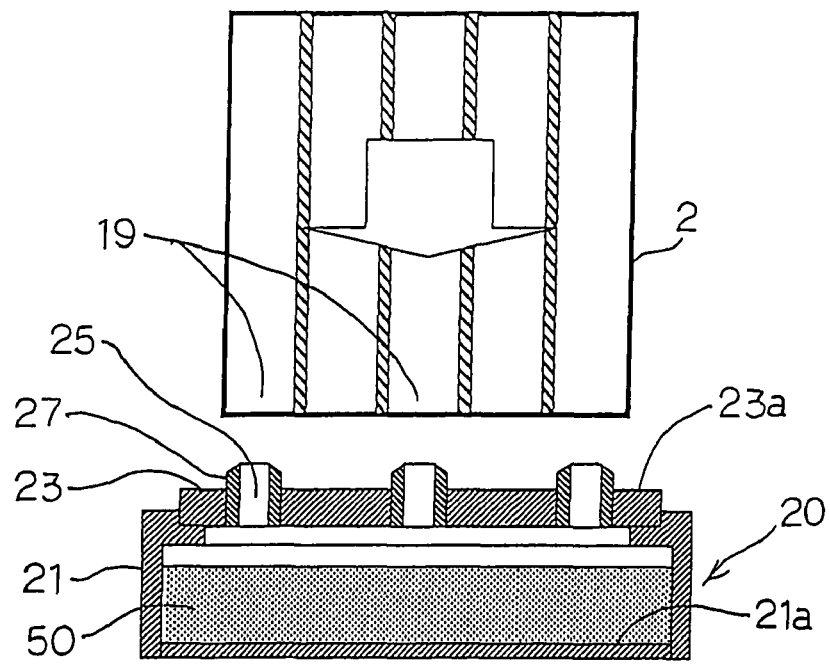
FIG. 1 is a schematic view showing an example of an embodiment of a manufacturing method of the present invention.
Figure 2:
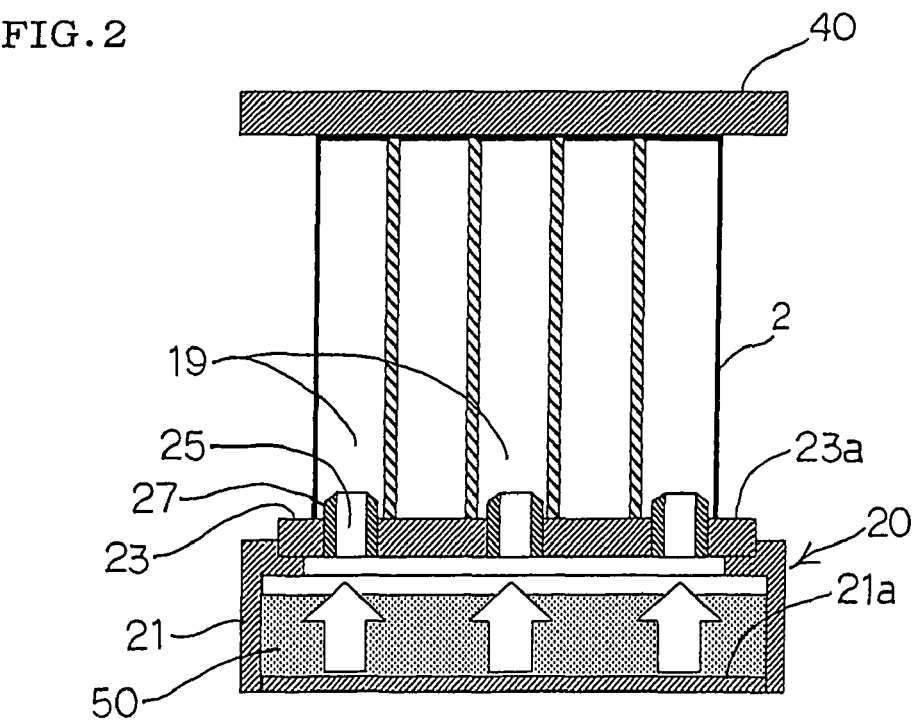
FIG. 2 is a schematic view showing an example of an embodiment of a manufacturing method of the present invention.
Figure 3:
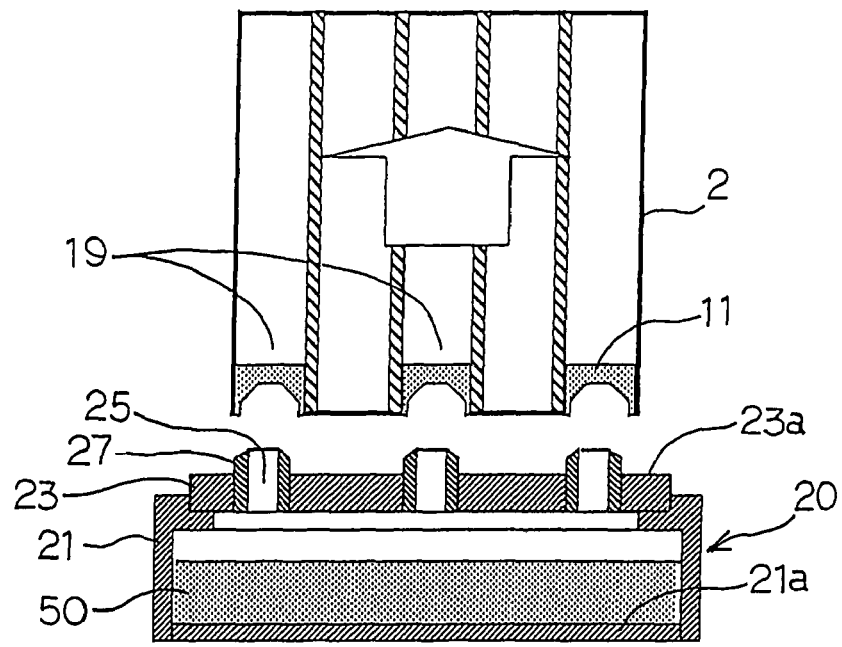
FIG. 3 is a schematic view showing an example of an embodiment of a manufacturing method of the present invention.

FIGS. 1 to 3 are schematic views showing an example of an embodiment of a manufacturing method of the present invention. In a manufacturing method of the present invention, a slurry filler 20 is used in order to fill plugging slurry into the inside of an opening end of each of the cells to be plugged of a honeycomb structure. The slurry filler 20 has a container 21 having an opening top and storing plugging slurry 50 prepared by slurring a material for the plugged portions and a cover 23 attached to the opening top of the container 21. The cover 23 has a flat upper face 23a and a plurality of through-holes 25 communicating the inside and the outside of the container 21 and being disposed so as to correspond to the positions of cells 19 to be plugged on an end face of the honeycomb structure 2. As the views, a pipe 27 having outer dimensions smaller than the size of the opening portion of the cell 19 may be attached to each of the through-holes 25.

Using such a slurry filler 20, as shown in FIG. 1, opening ends of the cells 19 to be plugged of the honeycomb structure 2 are positioned so as to match the positions of the through-holes 25 of the cover 23 in the first place. Next, as FIG. 2, the honeycomb structure 2 is set on the cover 23. Incidentally, it is preferable that a protrusion or a groove functioning as a standard for positioning upon setting the honeycomb structure 2 on the cover 23 is formed in an outer periphery of the honeycomb structure 2 and on a cover 23 of the slurry filler 20 to make the positioning easy. This is particularly suitable in the case that the honeycomb structure 2 is automatically set on the cover 23. For example, positioning can be controlled by recognizing positional coordinates of the protrusion or the groove by the use of image processing, or the like.

In the case that a pipe 27 having outer dimensions smaller than the size of the opening portion of the cell 19 is attached to each of the through-holes 25, when an opening end on the container outer side of the pipe 27 is protruded upward from an upper surface 23a of the cover 23, accurate positioning can easily be confirmed since the protruded portion of the pipe 27 is inserted into the inside of the opening end of the cell 19 to be plugged. Since the pipe 27 has outer dimensions smaller than the size of the opening portion of the cell 19, it inhibits partition walls defining the cells 19 from being damaged upon inserting the pipe 27 inside the opening end of the cell 19. In addition, when the pipe 27 attached to each of the through-holes 25 is movable on the cover 23, and a photograph of an end face of the honeycomb structure 2 is taken in advance and subjected to image processing to recognize positional coordinates of the cells 19 to be plugged, and the pipe is moved based on data of the positional coordinates so that a position of the pipe matches a position of the cell to be plugged, the pipe can be disposed in a position suitable for the position of the cell even in the case that a honeycomb structure as is designed cannot be obtained due to deformation or the like upon forming and that the position of the cell is subtly moved. As a moving means of the pipe 27, conventionally known various kinds of actuators may be used. When the movement is very little, a piezoelectric element may be also used.

As described above, a honeycomb structure 2 is set on the cover 23 of the slurry filler 20, and the plugging slurry 50 stored in the container 21 is filled into the inside of the opening ends of the cells 19 to be plugged via the through-holes 25 to form plugged portions. As a method for the filling, there may be employed, for example, a method where the bottom face 21a of the container 21 is made vertically movable with a piston mechanism or the like, and the volume of the container 21 is reduced to be smaller than the volume of the plugging slurry 50 contained in the container 21 by moving the bottom face 21a upward upon filling to send out the plugging slurry 50 into the end portions of the cells 19 to be plugged from the container 21 via the though-holes 25. Upon performing the filling by this method, it is preferable that the honeycomb structure 2 is slightly pressed with a plate-shaped pressing means 40 from the end face opposite to the end face in contact with the upper face 23a of the cover 23 so that the end face of the honeycomb structure 2 is brought into close contact with the upper face 23a of the cover 23 as FIG. 2 in order to inhibit the plugging slurry 50 from leaking.

In addition, as another filling method, the plugging slurry 50 may be sucked from the end face opposite to the end face in contact with the upper face 23a of the cover 23 of the honeycomb structure 2 to suck the plugging slurry 50 in the container 21 toward the inside of the end portions of the cells 19 to be plugged via the through-holes 25.

Thus, after the plugging slurry 50 is filled into the inside of the opening ends of the cells 19 to be plugged to form plugged portions 11 by the plugging slurry 50, as shown in FIG. 3, the honeycomb structure 2 is detached from the cover 23. The other end face of the honeycomb structure 2 is subjected to the same process, followed by drying and/or firing as necessary, to obtain a plugged honeycomb structure.

Figure 4:
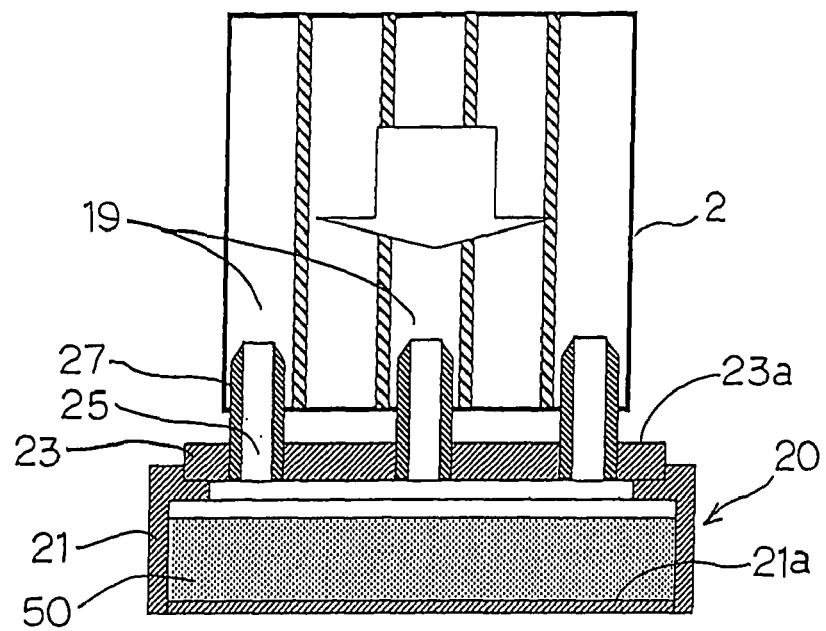
FIG. 4 is a schematic view showing another example of an embodiment of a manufacturing method of the present invention.
Figure 5:
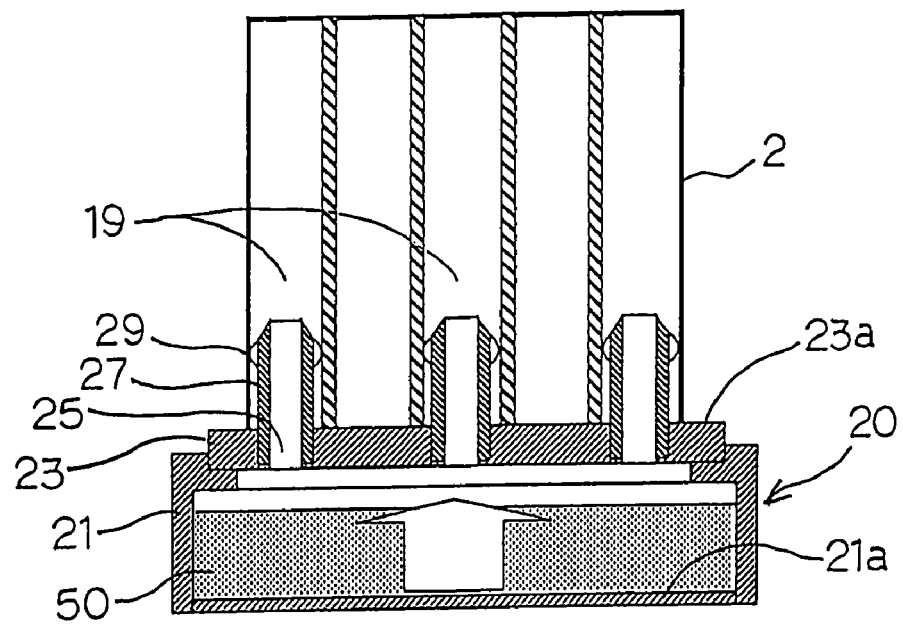
FIG. 5 is a schematic view showing another example of an embodiment of a manufacturing method of the present invention.

FIGS. 4 and 5 are schematic views showing another example of an embodiment of a manufacturing method of the present invention. In this example, a pipe 27 is attached to each of the through-holes 25 of the cover 23, an opening end on the container outer side of the pipe 27 protrudes upward from an upper surface 23a of the cover 23, and the protruding portion of the pipe 27 is inserted into the inside of an opening end of each of the cells 19 to be plugged upon setting the honeycomb structure 2 as FIG. 4. A sealing material 29 having a hollow ring-shape and expandable by supplying air therein is attached to an outer peripheral portion near the opening end on the container outer side of the pipe 27 to clog a gap between the pipe 27 inserted in the inside of each of the cells 19 and the cell 19 by expanding the sealing material 29 when the plugging slurry 50 is filled into the inside of the opening ends of the cells 19 to be plugged as shown in FIG. 5.

Figure 6:
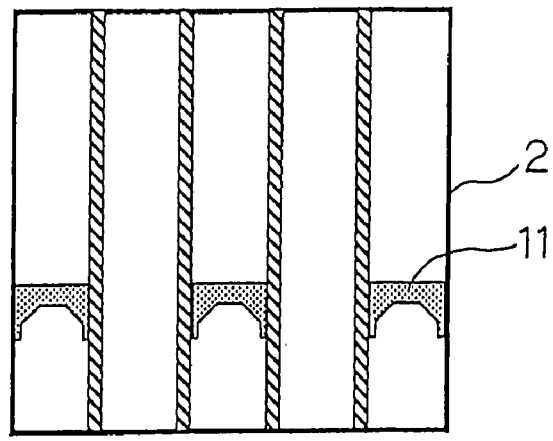
FIG. 6 is a schematic view showing a plugged honeycomb structure obtained in a manufacturing method shown in FIGS. 4 and 5.

By filling the plugging slurry 50 in such a state, a defect is not caused in the plugged portions due to dripping of the plugging slurry 50 even in the case that the plugging slurry 50 has low viscosity, and secure plugging can be entirely performed. In addition, by changing length of the protruding portion of the pipe 27, plugged portions 11 can be formed in arbitrary positions apart from an end face of the honeycomb structure 2 to some extent as shown in FIG. 6.

Figure 7:
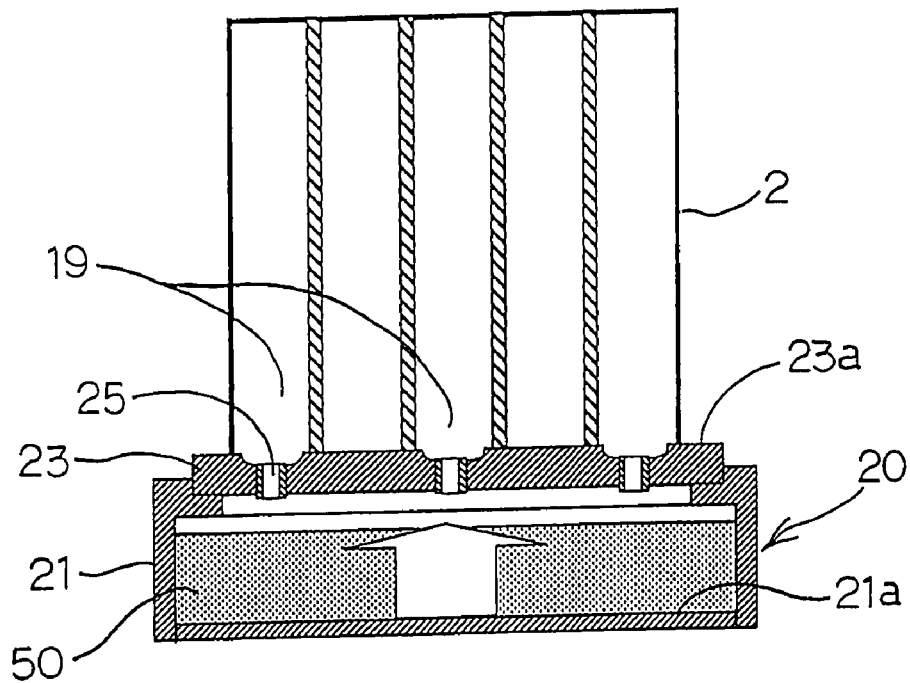
FIG. 7 is a schematic view showing still another example of an embodiment of a manufacturing method of the present invention.

FIG. 7 is a schematic view showing still another example of an embodiment of a manufacturing method of the present invention. In this example, a concave depression having dimensions smaller than the size of the opening portion of each of the cells 19 is formed in the periphery of the opening end on the container outer side of each of the through-holes 25 of the cover 23. By setting a honeycomb structure 2 on such a cover 23 and filling the plugging slurry 50 into the inside of opening ends of the cells 19 to be plugged, an end portion 11a on the honeycomb structure 2 on the outer side of the formed plugged portion 11 has a convex rising shape corresponding to the concave depression.

For example, in the case that the plugged honeycomb structure is used for a diesel particulate filter, when the end faces of the plugged portions on the end face on the exhaust gas inflow side rise in a convex shape, there is an advantage of allowing exhaust gas flowing into the filter to flow smoothly to suppress accumulation of particulate matter on the end faces. The embodiment is suitable for manufacturing a plugged honeycomb structure having such an advantage. Incidentally, by disposing the concave depression to be movable on the cover 23, taking a photograph of an end face of the honeycomb structure 2 in advance and subjecting the photograph to image processing to recognize positional coordinates of the cells 19 to be plugged, moving the concave depression based on data of the positional coordinates so that a position of the concave depression matches a position of the cell 19 to be plugged, and setting the honeycomb structure 2 on the cover 23, the concave depression can be disposed in a position suitable for the position of the cell even in the case that a honeycomb structure as is designed cannot be obtained due to deformation or the like upon forming and that the position of the cell is subtly moved. As a moving means of the concave depression, conventionally known various kinds of actuators may be used. When the movement is very little, a piezoelectric element may be also used.

In a honeycomb structure used for a manufacturing method of the present invention, a plurality of cells extending between two end faces are defined by porous partition walls. Though there is no particular limitation on a material constituting the honeycomb structure, it is required that the partition walls are porous. Therefore, generally, a material of ceramic (e.g., cordierite) is suitably used. A shape of the honeycomb structure is not particularly limited, and various shapes such as a cylindrical shape, a quadratic prism, and a triangular prism can be employed. Regarding a cell shape of the honeycomb structure, a rectangle is the most general shape. However, polygons such as a triangle, a hexagon, and an octagon, a circle, or a combination thereof may be employed.

The honeycomb structure has a partition wall thickness of preferably 100 to 2000 μm, more preferably 200 to 1000 μm, and furthermore preferably 300 to 700 μm. This is because, when the thickness is below 100 μm, thermal shock resistance may be lowered in some cases due to insufficient strength, and, when the thickness is above 2000 μm, pressure loss tends to increase.

The honeycomb structure has a cell density of preferably 20 to 600 cells/in$^2$ (cpsi), more preferably 50 to 400 cpsi, and furthermore preferably 100 to 300 cpsi. This is because, when the cell density is below 20 cpsi, contact efficiency with exhaust gas tends to be insufficient in the case that the honeycomb structure is used as a carrier or the like for a wall-flow type catalyst, and, when the cell density is above 600 cpsi, pressure loss tends to increase. Incidentally, "cpsi" is an abbreviation of "cells per square inch", which is a unit for expressing the number of cells per square inch. For example, 10 cpsi is approximately 1.55 cells/cm$^2$.

The honeycomb structure has a porosity of preferably 30 to 90%, more preferably 45 to 80%, and particularly preferably 50 to 70%. By the porosity of 30 to 90%, pressure loss is reduced, and heat capacity is reduced, and whereby mechanical strength as a structure can be maintained.

The honeycomb structure has an average pore size (pore diameter) of preferably 5 to 500 μm. When the average pore size is below 5 μm, pressure loss tends to rise. On the other hand, when the average pore size is above 500 μm, trapping efficiency may be lowered when the structure is used for a filter, and it is apprehended that contact area of a catalyst layer with exhaust gas cannot sufficiently be obtained in the case that the structure is used as a carrier or the like for a wall-flow type catalyst. In addition, by making the pores large, there is an influence of reduction in contact probability of a catalyst layer on the inner surface of the pores with components of exhaust gas passing through the pores.

A method for manufacturing a honeycomb structure is not particularly limited, and the honeycomb structure can be manufactured by, for example, a method where ceramic clay whose viscosity is suitably adjusted is subjected to extrusion molding with a die having predetermined cell shape, partition wall thickness, and cell density (cell pitch), followed by drying.

The plugging slurry can be prepared by, for example, mixing a dispersant (water or the like) with a ceramic powder. Further, as necessary, additives such as a bonding agent, a deflocculant, and a foaming resin may be added. Though a material for a ceramic powder is not particularly limited, it is preferable to use the same material as that for the honeycomb structure. As a bonding agent, poly(vinyl alcohol) or methyl cellulose can suitably be used.

A manufacturing method of the present invention does not require many steps such as bonding of an adhesive sheet on an end face of a honeycomb structure, image processing, making holes, and peeling of the adhesive sheet unlike the conventional manufacturing method and can manufacture a plugged honeycomb structure without any defect simply with less steps. In addition, since an adhesive sheet which is expensive and requires bonding operation in clean circumstances is not required, production costs can be suppressed, there is no restriction on operation circumstances, and industrial waste can be reduced.

A plugged honeycomb structure of the present invention is a plugged honeycomb structure manufactured by a manufacturing method of the present invention described above. The plugged honeycomb structure has a honeycomb structure where a plurality of cells extending between two opening ends are defined by porous partition walls and plugged portions disposed so as to plug one of the two opening ends of each of the cells. The plugged honeycomb structure is characterized in that cells to be plugged among the cells locating in the outermost periphery of the honeycomb structure are entirely plugged with the plugged portions.

In the manufacturing method of the present invention, by attaching a pipe to each of the through-holes of the cover of the slurry filler so as to correspond to the position of each of the cells to be plugged locating in the outermost periphery of a honeycomb structure and the size of the opening portion of the cell or by forming a concave depression in a periphery of an opening end on the container outer side of each of the through-holes, plugged portions can be formed in the cells to be plugged locating in the outermost periphery. To the contrary, by not attaching a pipe or not forming a concave depression intentionally in a position corresponding to the position of each of the cells to be plugged locating in the outermost periphery of a honeycomb structure, it is possible not to form a plugged portion in the cells locating in the outermost periphery where the cells should originally be plugged.

In the case that, after a peripheral portion of a honeycomb structure prepared by extrusion molding is removed by machining, coating is performed in the outer peripheral portion in order to form a new outer wall as described in JP-A-5-269388, it is not necessary to plug the cells in the outermost peripheral portion since the outermost peripheral portion of the honeycomb structure prepared by extrusion molding is removed by machining, and therefore, the range to be removed by machining, for example, the part for two or three cells from the outer periphery toward inside does not need plugging over the all surroundings. However, in the case that the outer peripheral portion of a honeycomb structure whose outer wall is integrally formed by extrusion molding is not removed by machining to be supplied as a product with the original outer wall, it is preferable to plug the cells in the outermost peripheral portion. In a conventional filter structure, an outer peripheral portion of each of the end faces of the honeycomb structure is held with a ring-shaped member simultaneously with wrapping a side face of the honeycomb structure with a holding material to hold the honeycomb structure in a cylindrical container lest the honeycomb structure should vibrate in a direction of cell passages upon practical use. In such a case, since the cells in the outermost peripheral portion of the honeycomb structure are blocked with a ring-shaped member even without plugging, it does not practically have a problem of trapping performance as a filter. However, nowadays, the honeycomb structure has a structure where the outer peripheral portion of each of the end faces is not held with a ring-shaped member so that an exhaust gas inflow area is increased and that pressure loss is planed to be reduced. According to this structure, plugging of the cells in the outermost peripheral portion is required.

Figure 10:
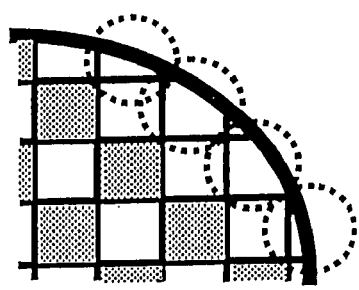
FIG. 10 is a schematic view showing a part of a conventional plugged honeycomb structure.

In the case of manufacturing a plugged honeycomb structure having plugged portions disposed in a checkerwise pattern in each of the end faces thereof by a method described in Patent Document 2 (JP-A-2002-159811), i.e., a method where an undried formed sheet-shaped green body having through-holes formed in a checkerwise pattern is applied on an end face of a honeycomb dried body under pressure and subjected to integrally firing, a plugged honeycomb structure where the cell to be plugged (the cells surrounded by the dotted lines) among the cells locating in the outermost periphery of the honeycomb structure may not be plugged or may incompletely be plugged as shown in FIG. 10 is prone to be obtained. In the case that such a plugged honeycomb structure is used as it is for, for example, a filter for filtrating and removing particulate matter, a trouble of discharging a part of particulate matter without being filtrated etc. Therefore, it is necessary to subject the honeycomb structure to a treatment of covering opening portions of the cells locating in the outermost periphery with a ring-shaped member by attaching a ring-shaped member on an end face of the honeycomb structure as described above, etc. In this case, the cells locating in the outermost periphery do not play a role as a filter or the like, and an effective area is reduced for the portions.

Figure 9:
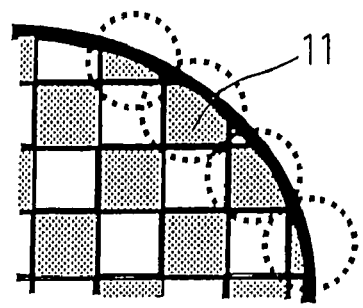
FIG. 9 is a schematic view showing a part of a plugged honeycomb structure of the present invention.

Since the cells to be plugged among the cells locating in the outermost periphery of the honeycomb structure (for example, the cells surrounded by the dotted lines in the case that a plugged honeycomb structure having plugged portions disposed so as to form a checkerwise pattern in an end face of a honeycomb structure is tried to be obtained) are entirely plugged by the plugged portions 11 as shown in FIG. 9 in the plugged honeycomb structure of the present invention, a treatment as described above is unnecessary in the case that the structure is used as a filter or a carrier for a wall-flow type catalyst. In addition, since there is no reduction of the effective area due to the treatment, the structure exhibits high performance.

Figure 8:
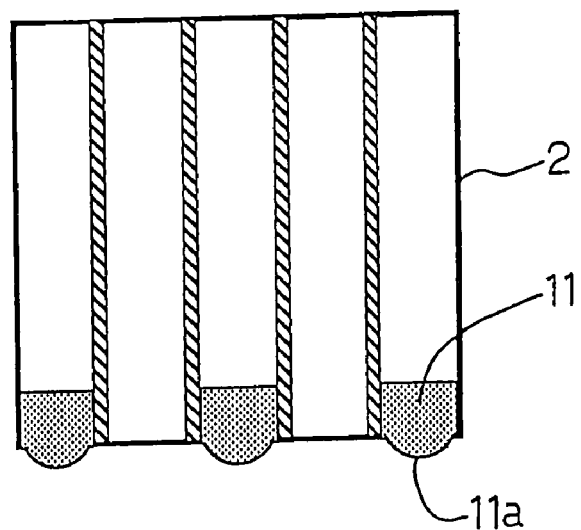
FIG. 8 is a schematic view showing a plugged honeycomb structure obtained in a manufacturing method shown in FIG. 7.
Figure 11:
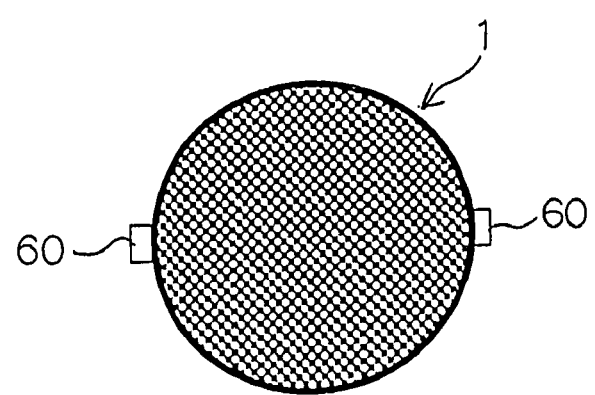
FIG. 11 is a schematic view showing an example of an embodiment of a plugged honeycomb structure of the present invention.
Figure 12A:
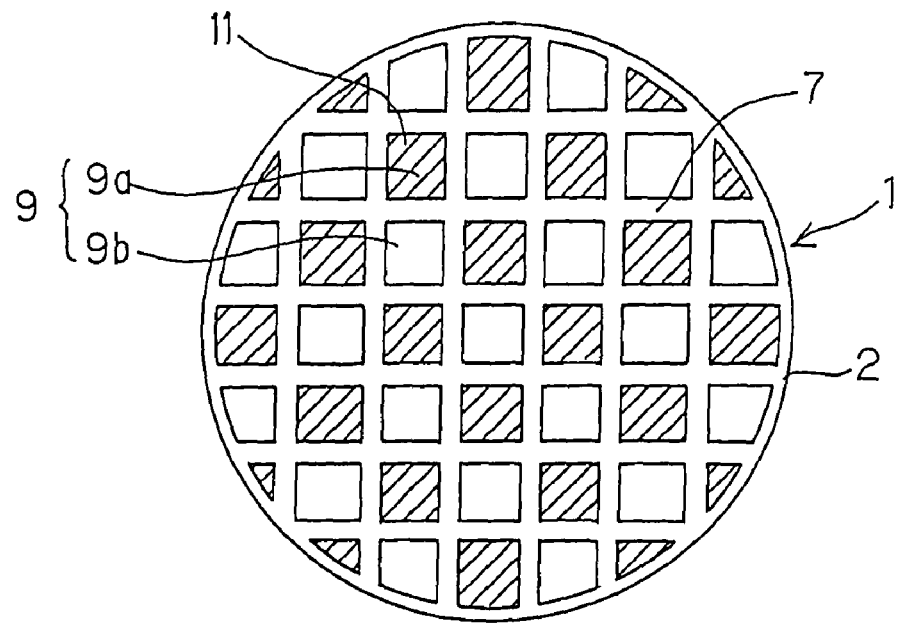
FIGS. 12(a) and 12(b) are schematic views each showing a basic structure of a plugged honeycomb structure.
Figure 12B:
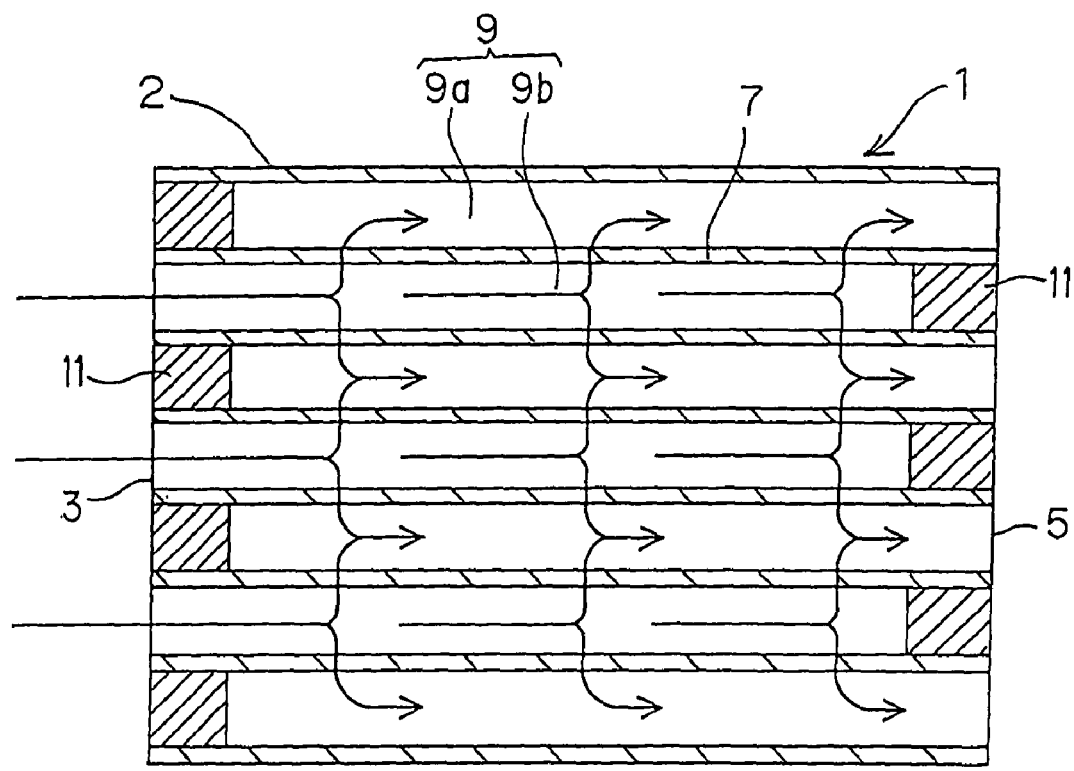

Such a plugged honeycomb structure can be manufactured by the above-mentioned manufacturing method of the present invention. Incidentally, in the case that a structure is manufactured by a manufacturing method of the present invention, a structure such as a protrusion 60 or a groove serving as a standard for positioning upon setting a honeycomb structure on a cover of a slurry filler may be formed in the outer peripheral portion of the plugged honeycomb structure 1 as shown in FIG. 11. In a structure manufactured by a manufacturing method of the present invention, in the case that a pipe is attached to each of the through-holes of the cover of the slurry filler upon manufacturing, the plugged portion 11 may have a concave portion corresponding to the shape of the pipe 27 as shown in FIGS. 3 and 6. In addition, in a structure manufactured by a manufacturing method-of the present invention, in the case that a concave depression is formed in the periphery of an opening end on the container outer side of the through-hole of the cover of the slurry filler upon manufacturing, the plugged portion 11 may have a convex portion corresponding to the shape of the concave depression as shown in FIG. 8. Incidentally, in a plugged honeycomb structure of the present invention, cells may be plugged by the plugged portions on only one end face.

The present invention can suitably be used as a honeycomb structure used for a filter for filtrating particulate matter such as a DPF, a carrier for a wall-flow type catalyst, or the like, and as a manufacturing method thereof.

What is claimed is:

1. A method for manufacturing a plugged honeycomb structure, the plugged honeycomb structure including a plurality of cells extending between two opening ends such that the plurality of cells are defined by porous partition walls and plugged portions disposed so as to plug one of the two opening ends of each of the cells, the method comprising:

providing a slurry filler having a container, the container having an open top;

storing plugging slurry prepared by slurring a material for the plugged portions in the container;

attaching a cover to the open top of the container, the cover having a flat upper face and a plurality of through-holes, the plurality of through-holes connecting an inside of the container to an outside of the container, the plurality of through-holes being disposed so as to correspond to positions of cells to be plugged on an end face of the honeycomb structure;

attaching a pipe to each of the plurality of through-holes, the pipe being movable relative to the cover in a direction perpendicular to a cell extending direction;

positioning the honeycomb structure on the cover so that the opening ends of the cells to be plugged of the honeycomb structure match positions of the through-holes of the cover; and filling the plugged slurry stored in the container into an inside of the opening ends of the cells to be plugged through the through-holes to form the plugged portions.

2. A method for manufacturing a plugged honeycomb structure, the plugged honeycomb structure including a plurality of cells extending between two opening ends such that the plurality of cells are defined by porous partition walls and plugged portions disposed so as to plug one of the two opening ends of each of the cells, the method comprising:

providing a slurry filler having a container, the container having an open top;

storing plugging slurry prepared by slurring a material for the plugged portions in the container;

attaching a cover to the open top of the container, the cover having a flat upper face and a plurality of through-holes, the plurality of through-holes connecting an inside of the container to an outside of the container;

attaching a pipe to the cover, the pipe having outer dimensions smaller than a size of opening ends of the cells, the pipe being movable relative to the cover in a direction perpendicular to a cell extending direction so as to correspond to a position of one of the cells to be plugged on an end face of the honeycomb structure;

positioning the honeycomb structure on the cover so that the opening ends of the cells to be plugged of the honeycomb structure match positions of the through-holes of the cover; and filling the plugged slurry stored in the container into an inside of the opening ends of the cells to be plugged through the through-holes to form the plugged portions.

3. A method for manufacturing a plugged honeycomb structure according to claim 2, further comprising an opening end of the pipe formed on an outer side of the container and protruding upward from an upper surface of the cover.

4. A method for manufacturing a plugged honeycomb structure according to claim 2, wherein:

an opening end of the pipe is formed on the outside of the container and protrudes upward from an upper surface of the cover; and the method further comprises providing a sealing material having a hollow ring-shape and expandable by supplying air therein, the sealing material being attached to an outer peripheral portion of the outside of the container near the opening end of the pipe, the sealing material being arranged to seal a gap between the pipe inserted in an inside of each of the cells to be plugged such that the sealing material expands when the plugging slurry is filled into the inside of the opening ends of the cells to be plugged.

5. A method for manufacturing a plugged honeycomb structure according to claim 2, further comprising:

photographing the end face of the honeycomb structure in advance; and subjecting the photograph to image processing to recognize positional coordinates of the cells to be plugged, the pipe is moved based on data of the positional coordinates so that a position of the pipe matches the position of the cell to be plugged, and then the honeycomb structure is set on the cover.

* * * * *